(12) United States Patent
Yaguchi et al.

(10) Patent No.: US 7,581,393 B2
(45) Date of Patent: Sep. 1, 2009

(54) STIRLING ENGINE

(75) Inventors: Hiroshi Yaguchi, Susono (JP); Daisaku Sawada, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 930 days.

(21) Appl. No.: 11/133,351

(22) Filed: May 20, 2005

(65) Prior Publication Data

US 2005/0274110 A1 Dec. 15, 2005

(30) Foreign Application Priority Data

Jun. 14, 2004 (JP) .............................. 2004-175682

(51) Int. Cl.
*F01B 29/10* (2006.01)
(52) U.S. Cl. .............................. 60/521; 60/522; 60/524
(58) Field of Classification Search .................. 60/517, 60/521, 522, 524
See application file for complete search history.

(56) References Cited

U.S. PATENT DOCUMENTS

| | | | | |
|---|---|---|---|---|
| 2,781,632 A | * | 2/1957 | Jan .............................. | 60/521 |
| 3,180,081 A | * | 4/1965 | Baker .......................... | 60/522 |
| 4,103,491 A | * | 8/1978 | Ishizaki ....................... | 60/519 |
| 4,231,222 A | * | 11/1980 | Fenton ........................ | 60/524 |
| 4,412,421 A | * | 11/1983 | Smith, Jr. .................... | 60/643 |
| 4,817,390 A | * | 4/1989 | Suganami et al. ............... | 62/6 |
| 5,085,054 A | * | 2/1992 | Katsuda et al. ............... | 60/517 |
| 6,543,229 B2 | * | 4/2003 | Johansson .................. | 60/605.1 |
| 6,874,321 B2 | * | 4/2005 | Ogura .......................... | 60/520 |

FOREIGN PATENT DOCUMENTS

| | | |
|---|---|---|
| DE | 32 34 679 A1 | 6/1983 |
| DE | 38 34 070 A1 | 4/1990 |
| DE | 40 24 558 A1 | 2/1992 |
| JP | U-60-105851 | 7/1985 |
| JP | A 64-342 | 1/1989 |
| JP | A-3-54348 | 3/1991 |
| JP | U-4-37858 | 3/1992 |

* cited by examiner

*Primary Examiner*—Hoang M Nguyen
(74) *Attorney, Agent, or Firm*—Oliff & Berridge, PLC

(57) ABSTRACT

A stirling engine includes a flow path that communicates a working space of the stirling engine and outside of the stirling engine. A working gas is supplied from the outside of the stirling engine to the working space via the flow path based on a differential pressure of the working space and the outside of the stirling engine.

13 Claims, 15 Drawing Sheets

STIRLING ENGINE

BACKGROUND OF THE INVENTION

1. Field of the Invention

The present invention relates to a stirling engine, and more particular, to a stirling engine suitable for increasing a working gas pressure of the stirling engine.

2. Description of the Related Art

In recent years, stirling engines which have an excellent theoretical thermal efficiency attract attention as an external combustion engine which collects exhaust heat from an internal combustion engine mounted on a vehicle such as an automobile, a bus, and a truck, as well as exhaust heat from factories.

Japanese Patent Application Laid-Open No. S64-342 discloses an output control apparatus for a stirling engine which includes a connection tube that connects a working space and a crankcase and an accumulator.

An efficient increase in the working gas pressure of the stirling engine is desired. In particular, when a pressuring device such as a pressurizing pump is to be used, reduction of energy used for the pressurization is desired.

SUMMARY OF THE INVENTION

In view of the foregoing, an object of the present invention is to provide a stirling engine which is capable of efficiently increasing a working gas pressure.

A stirling engine according to one aspect of the present invention includes a flow path that communicates a working space of the stirling engine and outside of the stirling engine. A working gas is supplied from the outside of the Stirling engine to the working space via the flow path based on a differential pressure of the working space and the outside of the stirling engine.

In the stirling engine, the flow path is provided with a filter that prevents an impurity from entering the working space from the outside into via the flow path.

In the stirling engine, the working gas is supplied from the outside of the stirling engine into the working space via the flow path when a pressure of the working gas in the working space is lower than a mean value of the pressure of the working gas in the working space in one cycle.

In the stirling engine, a working gas of an atmospheric pressure is supplied from the outside of the stirling engine into the working space via the flow path.

The stirling engine further includes a pressurized fluid supplying unit that is connected to the flow path at the outside of the stirling engine to supply a pressurized working gas.

In the stirling engine, the pressurized fluid supplying unit is a piston pump.

In the stirling engine, the piston pump is provided so that a phase of an intra-cylindrical pressure of the piston pump is of an opposite phase with the pressure of the working gas in the working space.

The stirling engine further includes a communication tube that communicates the working space with a crankcase of the stirling engine; and an opening and closing unit that opens and closes the communication tube. The opening and closing unit is put into a state where the communication tube is open when the pressure of the working gas in the working space is higher than a pressure of the crankcase.

In the stirling engine, the flow path is provided so that the flow path communicates the working space at a low temperature side of the stirling engine and the outside of the stirling engine.

The stirling engine further includes a cylinder; and a piston that reciprocates in the cylinder. The piston reciprocates in the cylinder while keeping cylinder airtight with an air bearing provided between the cylinder and the piston.

The stirling engine further include an approximately linear mechanism that is connected to the piston so that the approximately linear mechanism makes an approximately linear motion when the piston reciprocates in the cylinder.

A hybrid system according to another aspect of the present invention includes a stirling engine according to the present invention; and an internal combustion engine of a vehicle. The stirling engine is mounted on the vehicle and a heater of the stirling engine is provided to receive a heat from an exhaust system of the internal combustion engine.

In the hybrid system, the stirling engine includes at least two cylinders, and a heat exchanger including a cooler, a regenerator, and the heater. The heat exchanger is configured so that at least a portion of the heat exchanger forms a curve to connect the two cylinders. The curve is adapted to connect upper portions of the two cylinders where a dimension of an inner diameter of the exhaust tube of the internal combustion engine is approximately same with a distance between an end portion of the heater and an uppermost portion of the heater.

In the hybrid system, the stirling engine is attached to the vehicle so that pistons of the stirling engine reciprocate substantially horizontally.

In view of the foregoing, an object of the present invention is to provide a stirling engine which is capable of efficiently increasing a working gas pressure.

According to the stirling engine of the present invention, an efficient increase of the working gas pressure is allowed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, stirling engines according to embodiments of the present invention will be described in detail with reference to the accompanying drawings.

The embodiments which will be described below relate to pressurization of a working space, i.e., increase in working gas pressure, and pressurization of a crankcase 41. First, a common structure to all embodiments will be described followed by descriptions of pressurization of the working space (i.e., increase in working gas pressure) and the crankcase 41 according to the respective embodiments.

Figure 11:
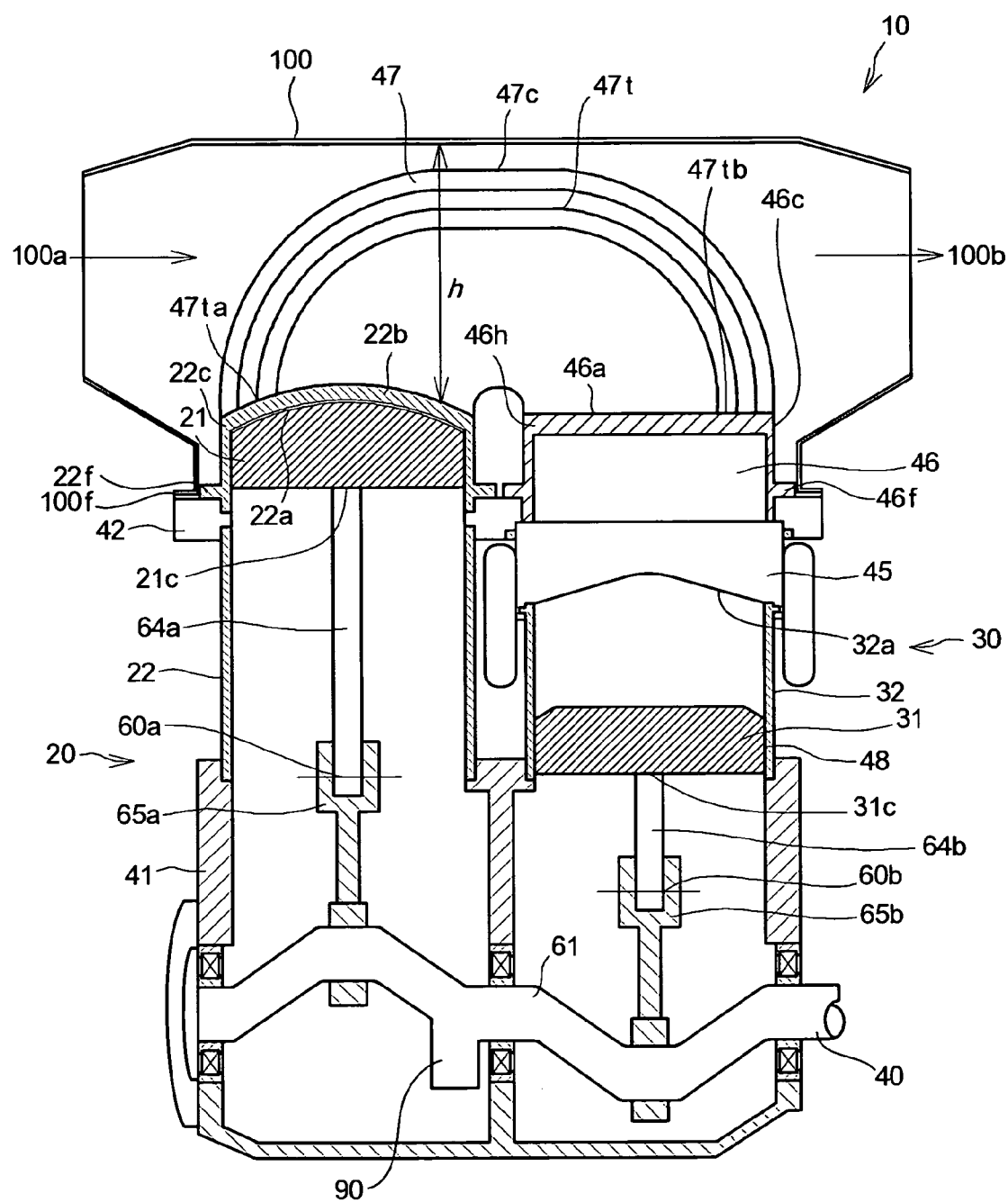
FIG. 11 is a sectional view of a basic common structure of the stirling engine according to the embodiments of the present invention.
Figure 13:
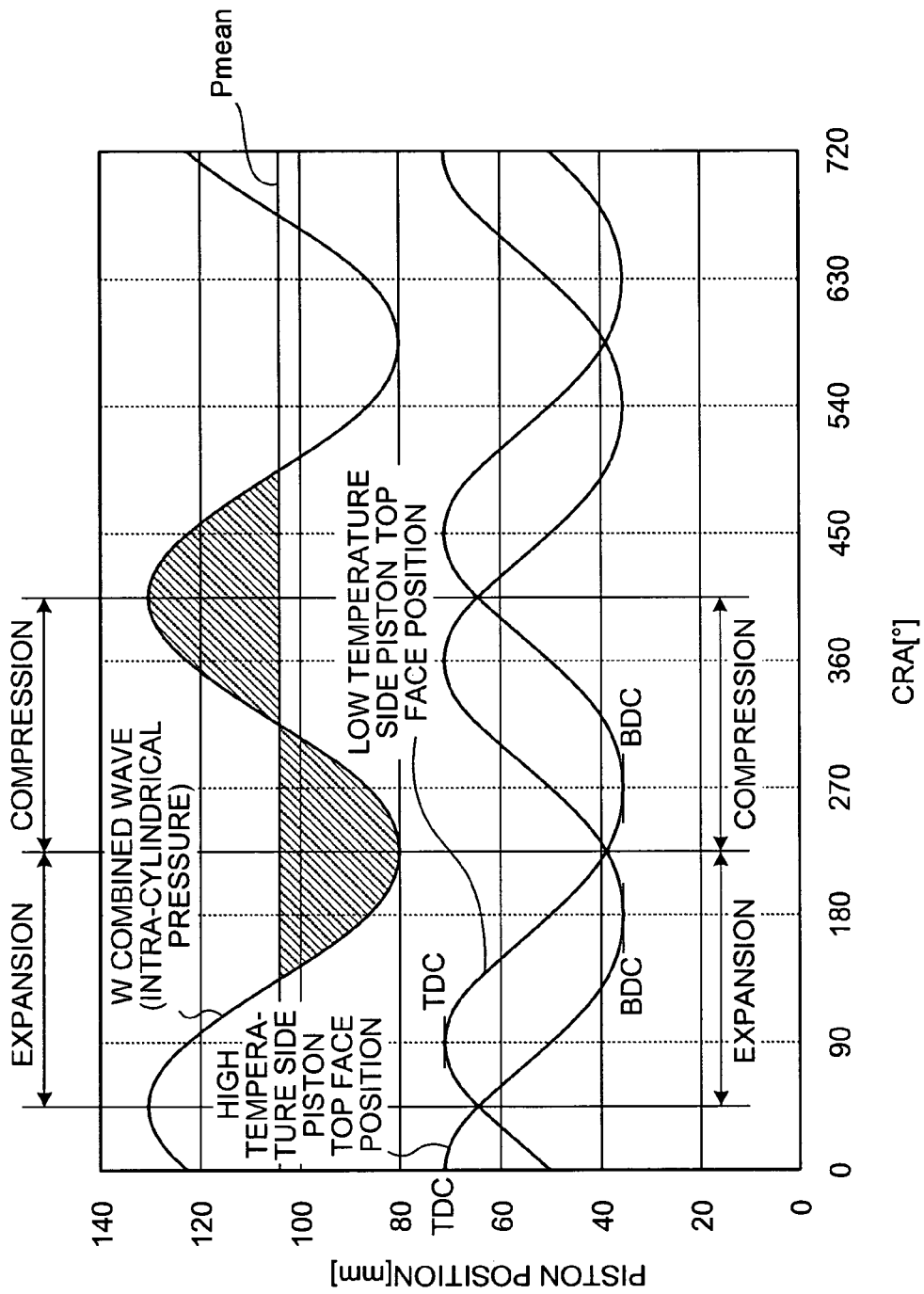
FIG. 13 is a graph of the intra-cylindrical pressure of the stirling engine according to the embodiments of the present invention.

FIG. 11 is a front sectional view of a stirling engine of the embodiments. As shown in FIG. 11, the stirling engine of the embodiments is a stirling engine 10 of α-type (two-piston type) and provided with two power pistons 20 and 30. Two power pistons 20 and 30 are arranged in parallel in line. A piston 31 of the power piston 30 on a low temperature side is arranged so that the piston 31 moves with a phase difference of 90° in a crank angle with respect to a piston 21 of the power piston 20 on a high temperature side as shown in FIG. 13.

A working fluid heated by a heater 47 flows into a space (expansion space) in an upper section of a cylinder 22 (hereinafter referred to as a high temperature side cylinder) of the power piston 20 on the high temperature side. A working fluid cooled by a cooler 45 flows into a space (compression space) in an upper section of a cylinder 32 (hereinafter referred to as a low temperature side cylinder) of the power piston 30 on the low temperature side.

A regenerator (regenerative heat exchanger) 46 stores heat while the working fluid flows back and forth between the expansion space and the compression space. In other words, when the working fluid flows from the expansion space to the compression space, the regenerator 46 receives heat from the working fluid, whereas the stored heat is transferred to the working fluid when the working fluid flows from the compression space to the expansion space.

The reciprocating flow of the working fluid caused by the reciprocating movement of two pistons 21 and 31 (also referred to as expansion piston 21 and compression piston 31 hereinbelow), changes the ratio of the working fluid in the expansion space of the high temperature side cylinder 22 and the compression space of the low temperature side cylinder 32, as well as the total volume of the fluid in the spaces to cause pressure variations. When the relation between the pressure level and the positions of the cylinders 21 and 31 is to be compared, the pressure is substantially higher when the expansion piston 21 is in a lower position than in a higher position, whereas the pressure is substantially lower when the compression piston 31 is in a lower position than in a higher position. Thus, the expansion piston 21 performs a positive work (expansion work) of a substantial amount to the outside, whereas the compression piston 31 needs to receive a work (compression work) from the outside. The expansion work is partly utilized for the compression work and the rest is extracted as an output via a driving shaft 40.

Figure 12:
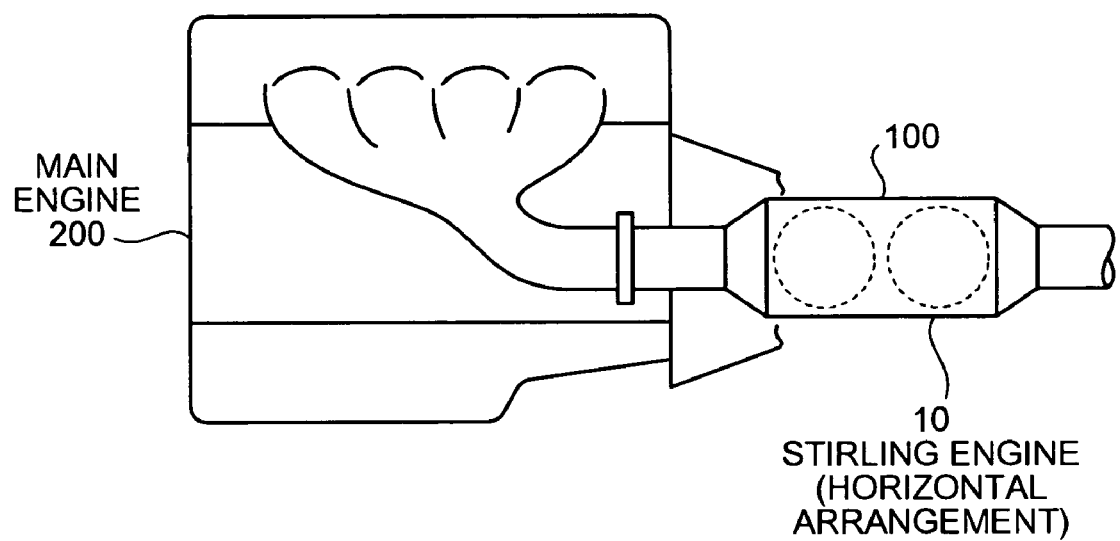
FIG. 12 is a plan view of an attachment state of an internal combustion engine and the stirling engine of the embodiments of the present invention.

The stirling engine of the embodiments is employed with a main engine 200, a gasoline engine or an internal combustion engine, for example, in a vehicle as shown in FIG. 12, thereby forming a hybrid system. In other words, the stirling engine 10 is an exhaust heat collecting unit which utilizes exhaust gas from the main engine 200 as a heat source. With the heater 47 of the stirling engine 10 placed in an exhaust tube 100 of the main engine 200 of the vehicle, heat energy collected from the exhaust gas heats up the working fluid thereby starting up the stirling engine 10.

Since the stirling engine 10 of the embodiments is placed in a limited space in the vehicle, e.g., the heater 47 is housed in the exhaust tube 100, the overall structure thereof is preferably made compact to increase the degree of freedom in installation. To this end, in the stirling engine 10, two cylinders 22 and 32 are not arranged in a "V" configuration but placed in a parallel in-line layout.

The heater 47 is arranged inside the exhaust tube 100, so that a side of the heater 47 on the side of high temperature side cylinder is located at an upstream side 100a (a side closer to the main engine 200) of the exhaust gas where exhaust gas of a relatively high temperature flows in the exhaust tube 100, whereas a side of the heater 47 on the side of the low temperature side cylinder 32 is located at a downstream side 100b (a side farther from the main engine 200) where exhaust gas of a relatively low temperature flows. Such arrangement intends to heat up the side of the heater 47 on the side of the high temperature side cylinder 22 to a higher level.

Each of the high temperature side cylinder 22 and the low temperature side cylinder 32 is formed in a cylindrical shape and supported by a base plate 42 which serves as a baseline. In the embodiments, the base plate 42 serves to provide a reference position for respective components of the stirling engine 10. With such structure, the relative location accuracy of respective components of the stirling engine 10 can be secured. In addition, the base plate 42 can be used as a reference for attachment of the stirling engine 10 to the exhaust tube 100 (exhaust path) which provides exhaust heat to be collected.

The base plate 42 is fixed to a flange 100f of the exhaust tube 100 via a heat insulating material (spacer not shown). The base plate 42 is also fixed to a flange 22f provided in a side face (outer peripheral surface) 22c of the high temperature side cylinder 22. The base plate 42 is also fixed to a flange 46f provided in a side face (outer peripheral surface) 46c of the regenerator 46.

The exhaust tube 100 is attached to the stirling engine 10 via the base plate 42. The stirling engine 10 is attached to the base plate 42 so that an end face (an upper face of a top portion 22b) of the high temperature side cylinder 22 where the heater 47 is connected, and an end face (a top face 32a) of the low temperature side cylinder 32 where the cooler 45 is connected are substantially parallel with the base plate 42. Alternatively, the stirling engine 10 is attached to the base plate 42 so that the base plate 42 is parallel with a rotation shaft of a crank shaft 61 (or the driving shaft 40) or so that a central axis of the exhaust tube 100 is parallel with the rotation shaft of the crank shaft 61. Thus, the stirling engine 10 can be readily attached to the exhaust tube 100 of an existing type without a major change in design. As a result, the stirling engine 10 can be attached to the exhaust tube 100 without impoverishing the characteristics such as performance, mountability and a noise-reducing feature, of the internal combustion engine of a vehicle from which the exhaust gas is collected. In addition, since the stirling engine 10 of the same specification can be attached to a different exhaust tube only with a change in specification of the heater 47, the versatility of the stirling engine can be enhanced.

The stirling engine 10 is arranged horizontally in a space adjacent to the exhaust tube 100 which is placed under a floor of the vehicle. In other words, the stirling engine 10 is arranged so that the axes of the high temperature side cylinder 22 and the low temperature side cylinder 32 are substantially parallel with the floor (not shown) of the vehicle. Two pistons 21 and 31 reciprocate horizontally. In the embodiments, an upper dead point side and a lower dead point side of two pistons 21 and 31 are referred to as an upper direction and a lower direction, respectively, for the simplicity of description.

A higher output can be obtained when a mean pressure (Pmean described later) of the working fluid is higher since a differential pressure at the same temperature difference caused by the cooler 45 and the heater 47 is larger. Hence, as described above, the working fluid in the working space of the high temperature side cylinder 22 and the low temperature side cylinder 32 is maintained in a high pressure.

The pistons 21 and 31 are formed in a cylindrical shape. Between the outer peripheral surface of pistons 21 and 31 and the inner peripheral surface of the cylinders 22 and 32, a minute clearance of a few ten micrometers (μm) is provided. The working fluid (air) of the stirling engine 10 is present in the clearance. The pistons 21 and 31 are supported by an air bearing 48 so that the pistons do not contact with the cylinders 22 and 32, respectively. Hence, piston rings are not provided around the pistons 21 and 31, and lubricant which is generally used together with the piston ring is not employed. To the inner peripheral surface of the cylinders 22 and 32, however, an antifriction is fixed. Though resistance of the air bearing 48 toward sliding movement caused by the working fluid is originally extremely low, the antifriction is provided for further resistance reduction. As described above, the air bearing 48 serves to maintain the expansion space and the compression space airtight with the working fluid (air) and seals the clearance without the piston ring and the lubricant.

The heater 47 includes a plurality of heat transfer tubes (tube group) 47*t*, each of which is formed generally in a U-shape. A first end portion 47*ta* of each heat transfer tube 47*t* is connected to the upper portion (top portion) (end face at the side of a top face 22*a*) 22*b* of the high temperature side cylinder 22. A second end portion 47*tb* of each heat transfer tube 47*t* is connected to an upper portion (end face at the side of the heater 47) 46*a* of the regenerator 46. The reason why the heater 47 is formed generally in U-shape as described above will be described later.

The regenerator 46 includes a heat storage material (matrix not shown) and a regenerator housing 46*h* that houses the matrix. Since the regenerator housing 46*h* accommodates the working fluid of high pressure, the regenerator housing 46*h* is formed as a pressure-tight container. The regenerator 46 here includes laminated metallic meshes as the matrix.

The regenerator 46 has to meet the following conditions to realize the above described functions. The regenerator 46 is required to have a high heat transfer performance, a high heat storage capacity, a low flow resistance (flow loss, pressure loss), a low heat conductivity in a direction of the working fluid flow, and a large thermal gradient. The metallic mesh may be formed of stainless steel. When the working fluid passes through each of the laminated metallic meshes, heat of the working fluid is transferred and stored in the metallic mesh.

A connecting portion (shape of a cross section) of the heater 47 with the high temperature side cylinder 22 is formed in the same shape and size with the shape of an opening (perfect circle) of the upper portion (a connecting portion with the heater 47) of the high temperature side cylinder 22. Similarly, a connecting portion of the heater 47 with the regenerator 46 is formed in the same shape and size with the upper face of the regenerator 46. Thus, the cross sections of the heater 47 and the regenerator 46 are formed in the same shape and size with the openings of the high temperature side cylinder 22 and the low temperature side cylinder 32, respectively. With such a structure, resistance of a flow path (flow resistance) of the working fluid is decreased.

The crank shaft 61 is rotatably supported by a bearing with respect to the crankcase 41. In the embodiments, a counterweight 90 is provided on a side of the high temperature side cylinder 22. The position of the counterweight 90 is selected so as to minimize the influence on the vertical size of the overall stirling engine 10. A sufficient space can be secured in the space on a side of the high temperature side cylinder 22.

Next, a reason why the heater 47 is formed generally in U-shape (curved shape) as described above will be described.

The heat source of the stirling engine 10 is the exhaust gas of the main engine 200 of the vehicle as described above and not a heat source dedicated exclusively to the stirling engine. Hence, the amount of heat to be obtained is not very large. The stirling engine 10 is required to start up with a small amount of heat obtained from the exhaust gas, of approximately 800° C., for example. Thus, the heater 47 of the stirling engine 10 is required to efficiently receive the heat from the exhaust gas in the exhaust tube 100.

A volume of a heat exchanger which includes the heater 47, the regenerator 46, and the cooler 45 is a void volume, which does not directly affect the output. When the volume of the heat exchanger increases, the output of the stirling engine 10 decreases. On the other hand, when the heat exchanger is made small in volume, the heat exchange becomes difficult and the received amount of heat decreases, whereby the output of the stirling engine 10 is decreased. Hence, to realize both the decrease in the void volume and the increase in the received amount of heat, the efficiency of the heat exchanger is required to be enhanced. In other words, the efficient receipt of heat by the heater 47 is required.

To realize the efficient heat receipt from the exhaust gas in the exhaust tube 100 and the efficient heat exchange, the whole structure of the heater 47 is required to be accommodated in the exhaust tube 100 in just proportion, and the cooler 45 is required to be located outside the exhaust tube 100 to avoid receiving the heat from the exhaust gas. Hence, when the flange 100*f* where the exhaust tube 100 is attached to the stirling engine 10 is taken as a reference, a position of attachment of the low temperature side cylinder 32 is lower than a position of attachment of the high temperature side cylinder 22 at least by the height of the cooler 45. Thus, a position of the compression space formed in the upper section of the low temperature side cylinder 32 is lower than the position of the expansion space formed in the upper section of the high temperature side cylinder 22, and an upper dead point of the compression piston 31 is lower than a position of an upper dead point of the expansion piston 21.

In the embodiments, piston pins 60*a* and 60*b* are connected to pistons 21 and 31, respectively, with extensions (piston supports) 64*a* and 64*b* of different sizes to change the positions of the upper dead points of the pressurizing piston 31 and the expansion piston 21. Since the position of the upper dead point of the expansion piston 21 is higher than the upper dead point of the compression piston 31, the extension 64*a* connected to the expansion piston 21 is longer than the extension 64*b* connected to the compression piston 31 by the difference in the height of position of the upper dead point.

In the embodiments, the expansion piston 21 and the compression piston 31 are formed so that the lengths thereof are equal. In other words, the distances between the upper faces of pistons 21 and 31 and connection points 21*c* and 31*c* with the extensions 64*a* and 64*b* of the pistons 21 and 31, respectively, are made equal. Therefore, the extensions 64*a* and 64*b* are formed in different lengths to arrange the upper dead points of the piston 21 and 31 at different positions. Alternatively, the extensions of the expansion piston and the compression piston may be formed in the same length, and the lengths of the expansion piston and the compression piston may be made different. Thus, the positions of the upper dead points of the expansion piston and the compression piston can be made different. A technical advantage of such structure where the vertical length of the expansion piston itself is made longer than that of the compression piston itself will be described below.

For the suppression of deterioration in the efficiency of the stirling engine 10, a space outside the expansion space in the high temperature side power piston 20 and a space outside the compression space in the low temperature side power piston 30, i.e., a space around the crank shaft 61 in each of the high temperature side power piston 20 and the low temperature side power piston 30 is required to be maintained at a room temperature. Hence, secure sealing must be provided between the high temperature side cylinder 22 and the expansion piston 21, and between the low temperature side cylinder 32 and the compression piston 31, so that the working fluid of a high temperature in the expansion space will not flow into the space around the crank shaft 61 at the side of the high temperature side power piston 20 and the working fluid of a low temperature in the compression space will not flow into the space around the crank shaft 61 on the side of the low temperature side power piston 30. As described later, the air bearing 48 is employed to achieve such sealing.

On the other hand, since the top portion 22*b* and the side face 22*c* of the high temperature side cylinder 22 are housed inside the exhaust tube 100 as described above, the upper portion of the high temperature side cylinder 22 and the upper portion of the expansion piston 21 thermally expand. Then, the sealing might not be secured in a section where the upper portions of the high temperature side cylinder 22 and the expansion piston 21 expand. To avoid such inconvenience, the expansion piston 21 and the high temperature side cylinder 22 may be formed longer in the vertical direction to provide a thermal gradient in vertical direction of the expansion piston 21. Then, the secure sealing can be guaranteed with the section not affected by the thermal expansion, i.e., the lower portion of the expansion piston 21. Further, since the sealing between the high temperature side cylinder 22 and the expansion piston 21 is provided with the lower portion of the expansion piston 21, i.e., the section not affected by the thermal expansion, the high temperature side cylinder 22 may be formed longer in the vertical direction to guarantee the sufficient moving distance for the sealing section and to sufficiently pressurize the expansion space.

The structure of the embodiments is preferable regardless of the type of the heat source, since such structure allows efficient reception of heat from the heat source and efficient heat exchange by providing the heater with a large heat transfer area for the reception of heat energy and the cooler which can be arranged in a position not heated.

In particular, when the exhaust heat is to be utilized, the heat energy is generally supplied by the exhaust gas through a tube. Then, an area where the heat can be received (tube interior, for example) is relatively limited. In such case, the structure of the stirling engine 10 as described above is particularly preferable since it provides a large heat transfer area and a cooler is arranged in a position not heated. A technical advantage of the structure of the stirling engine 10 will be further described below.

A smaller void volume (the cooler, the regenerator, and the heater) is preferable as described above. In addition, when the void volume section has a curved shape, the resistance in the flow path becomes large when many such curved portions exist whereas the resistance in the flow path increases when the curvature of the curved portion is small. In other words, with the pressure loss of the working fluid considered, preferably a single curved portion with a large curvature is provided. Though the heater 47 is generally in U-shape, the heater 47 has only one curved portion. In addition, the cooler 45 is formed to have a curved portion for the downsizing of the stirling engine 10 (reduction in vertical dimension), whereby the structure with the features as described above is realized.

In addition, as shown in FIG. 11, the curvature of the void volume portion in the embodiments is set according to the arrangement where the upper portions of two cylinders 22 and 32 arranged in parallel in line are coupled, and the vertical distance between the top portion 22*b* of the high temperature side cylinder 22 and the upper face 46*a* of the regenerator 46 arranged approximately in the same plane to suppress the increase in flow resistance of the working fluid in the exhaust tube 100 and the upper inner face of the exhaust tube 100 is set to a height h which is approximately equal to the distance between the end portions 47*ta* and 47*tb* and the uppermost portion of a central portion 47*c* of the heater 47. To secure a large contact area with the fluid heat source such as the exhaust gas in a limited space such as the interior of the exhaust tube 100, the curved shape as described above is desirable.

With such advantages considered, the heater in the void volume portion is preferably formed in a curved shape such as a U-shape or a J-shape, so that the entirety of the heater is housed in a limited space (heat-receiving space) receiving the heat from the heat source such as the interior of the exhaust tube and a maximum area to receive the heat from the heat source can be secured and the resistance of the flow path is minimized in the heat-receiving space.

To minimize the resistance of the working fluid in the flow path, the regenerator 46 is arranged linearly (along the same axis) along a direction of extension (direction of axis) of the low temperature side cylinder 32. Thus, the regenerator 46 connected to a second end portion 47*tb* of the heater 47 is arranged along the direction of extension of the low temperature side cylinder 32. A first end portion 47*ta* of the heater 47 is seamlessly connected to the upper portion of the high temperature side cylinder 22. Thus, the heater 47 has portions extending along the directions of extension of the high temperature side cylinder 22 and the low temperature side cylinder 32 at least at the sides of the first end portion 47*ta* and the second end portion 47*tb* of the heater 47, and the central portion 47*c* of the heater 47, in many cases, has a curved shape as described above.

Due to the technical reasons as described above, the heater 47 is formed in a curved shape between two cylinders 22 and 32 which are arranged in parallel in line. Thus, the heater 47 has a curved portion connecting two cylinders 22 and 32.

Next, a sealing structure of a piston/cylinder section and a mechanism of a piston/crank section will be described.

As described above, since the heat source of the stirling engine 10 is the exhaust gas from the internal combustion engine of the vehicle, the obtainable amount of heat is limited and the stirling engine 10 is required to function in the range of obtainable heat amount. Hence, in the embodiments, the internal friction of the stirling engine 10 is minimized as far as possible. In the embodiments, to eliminate the friction loss by the piston ring which generally produces the largest friction loss among the internal friction in the stirling engine, the piston ring is eliminated from the structure. In place of the piston ring, the air bearing 48 is provided between the cylinders 22 and 32 and the pistons 21 and 31, respectively.

The air bearing 48 can significantly reduce the internal friction of the stirling engine 10 since the sliding resistance thereof is extremely small. Since the cylinders 22 and 32 and the pistons 21 and 31 are secured airtight also with the air bearing 48, the working fluid of a high temperature would not leak out at the time of expansion and contraction.

The air bearing 48 utilizes the air pressure generated in the minute clearances between the cylinders 22 and 32 and the pistons 21 and 31 to support the pistons 21 and 31 in a floating position. The air bearing 48 of the embodiments has a clearance of a few ten micrometers (μm) in diameter between the cylinders 22 and 32 and the pistons 21 and 31. To realize the air bearing that supports a material in a floating position, a mechanism may be structured to have a high air pressure section (thereby creating pressure gradient). Alternatively, a highly-pressurized air may be sprayed as described later.

The air bearing used in the embodiments is not the type to which the highly-pressurized air is sprayed but an air bearing which has the same configuration as an air bearing employed between a cylinder and a piston for a glass injection syringe for medical application.

In addition, since the use of the air bearing 48 eliminates the lubricant which is used for the piston ring, the deterioration of the heat exchanger (the regenerator 46 and the heater 47) of the stirling engine 10 is not caused by the lubricant. Here, as far as the inconvenience accompanying the use of the lubricant and the piston ring, such as the sliding resistance, can be eliminated, any air bearings excluding one type of fluid dynamic bearing called an oil bearing which uses oil may be employed other than the air bearing 48.

Alternatively, a static pressure air bearing may be employed between the pistons 21 and 31 and the cylinders 22 and 32 of the embodiments. The static pressure air bearing floats a material (the pistons 21 and 31 in the embodiments) by spraying a pressurized fluid and utilizing a generated static pressure. Alternatively, a dynamical pressure air bearing may be employed instead of the static pressure air bearing.

When the pistons 21 and 31 reciprocate inside the cylinders 22 and 32 with the use of the air bearing 48, an accuracy of linear motion should be maintained below the clearance in diameter of the air bearing 48. Further, since the loading capacity of the air bearing 48 is small, a side force applied by the pistons 21 and 31 is required to be substantially zero. In other words, since the air bearing 48 has a little capacity to bear the force applied in a direction of a diameter of the cylinders 22 and 32, i.e., a lateral direction or a thrust direction, the accuracy of linear motion of the pistons 21 and 31 with respect to axes of the cylinders 22 and 32 is required to be particularly high. In particular, since the air bearing 48 of the embodiments which floats and supports the material with the air pressure produced by the minute clearance has a lower pressure bearing capacity in the thrust direction compared with the type of bearing that sprays the highly-pressurized air, an accordingly higher accuracy of linear motion of the piston is required.

Hence in the embodiments, a grasshopper mechanism 50, i.e., an approximately linear link, is employed for the piston/crank section. The grasshopper mechanism 50 achieves the same accuracy of linear motion in a smaller mechanism compared with other approximately linear mechanism (the Watt mechanism, for example), thereby providing a more compact overall system. In particular, since the stirling engine 10 of the embodiments is installed in a limited space, for example, the heater 47 thereof is housed in the exhaust tube of the vehicle, a more compact overall system increases a degree of freedom in installation. In addition, the grasshopper mechanism 50 can achieve the same accuracy of linear motion in a lighter mechanism compared with other mechanisms, and is advantageous in terms of fuel consumption. Further, the grasshopper mechanism 50 has a relatively simple structure and is easy to build (manufacture/assemble).

Figure 14:
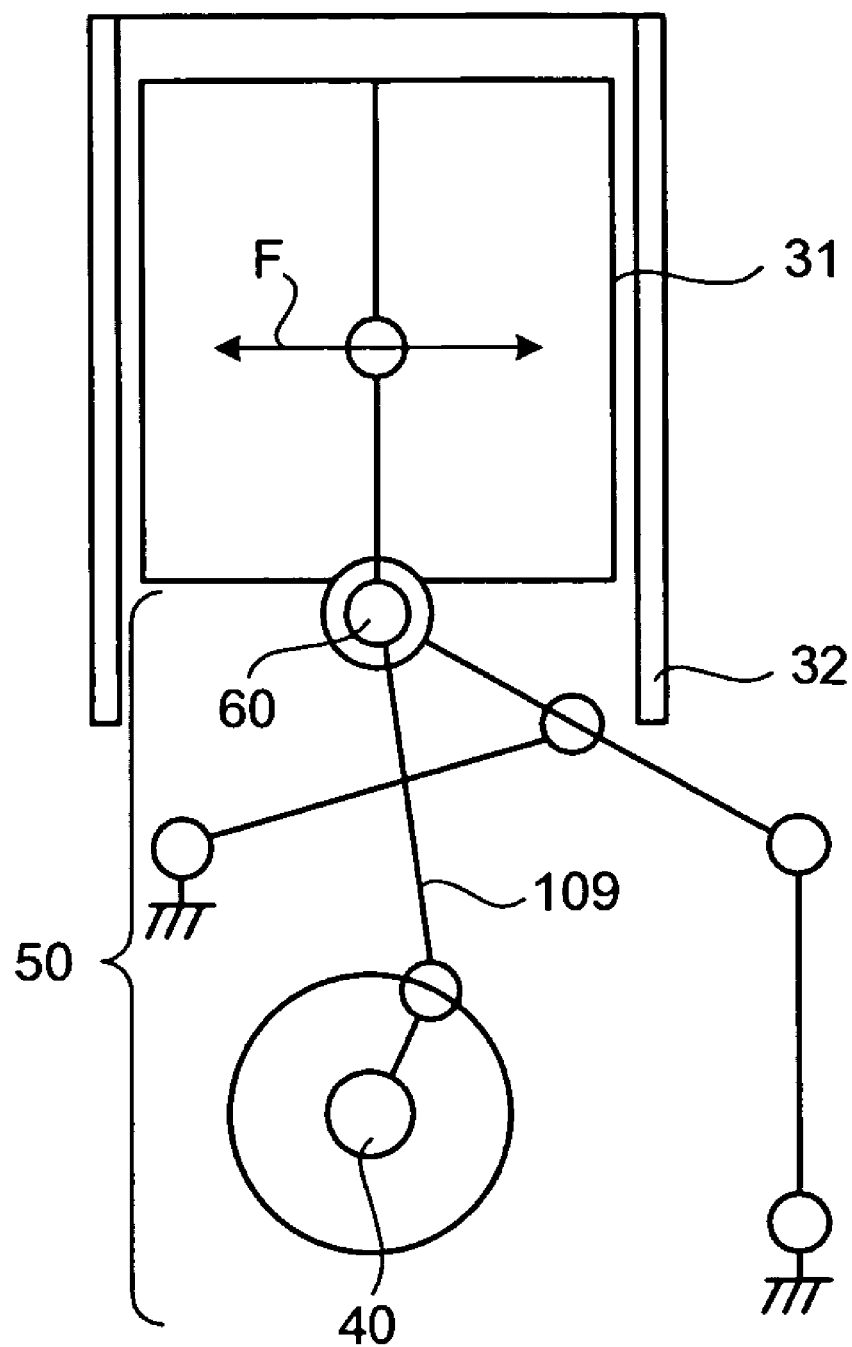
FIG. 14 is an explanatory diagram of approximately linear mechanism applied to the stirling engine according to the embodiments of the present invention.

FIG. 14 shows a schematic structure of a piston/crank mechanism of the stirling engine 10. In the embodiments, the piston/crank mechanism adopts a common structure for the high temperature side power piston 20 and the low temperature side power piston 30. A description will be given hereinbelow only on the low temperature side power piston 30 and a description on the high temperature side power piston 20 will be omitted.

As shown in FIGS. 14 and 11, a reciprocating movement of the pressurizing piston 31 is transferred to the driving shaft 40 via a connecting rod 109 (65a and 65b) and converted into a rotation movement. The connecting rod 109 is supported by the approximately linear mechanism 50 shown in FIG. 14 to make the low temperature side cylinder 32 reciprocate linearly. With the approximately linear mechanism 50 supporting the connecting rod 109, the side force F produced by the compression piston 31 is substantially zero. Hence, even the air bearing 48 with a small load bearing capacity can sufficiently support the compression piston 31.

Next, pressurization of the working fluid in the working space of the stirling engine 10 and pressurization of the crankcase 41 will be described.

As described above, a high output can be obtained when the mean working gas pressure Pmean of the working fluid in the working space of the stirling engine 10 is maintained at a high level. In addition, in the stirling engine 10 of the embodiments, the pressure in the crankcase 41 is raised up to the mean working gas pressure Pmean inside the cylinder of the stirling engine 10. The increase in the pressure in the crankcase 41 up to the mean working gas pressure Pmean inside the cylinder of the stirling engine 10 is intended to eliminate the need of a high strength of the components (piston, for example) of the stirling engine 10 in the design thereof.

In other words, when the pressure of the crankcase 41 is at the level of the mean working gas pressure Pmean inside the cylinder of the stirling engine 10, the differential pressure of the intra-cylindrical pressure of the stirling engine 10 and the pressure inside the crankcase 41 can be suppressed to the differential pressure between the maximum (or minimum) intra-cylindrical pressure and the mean working gas pressure Pmean at the maximum. Thus, with the suppression of differential pressure between the intra-cylindrical pressure of the stirling engine 10 and the pressure of the crankcase 41, the strength of the components of the stirling engine 10 can be low. When the components are not required to have a high strength, lighter components can be realized.

In the stirling engine 10 of the embodiments, the crankcase 41 is pressurized prior to a normal operation up to the mean working gas pressure Pmean inside the cylinder of the stirling engine 10.

First, pressurization of the working fluid in the working space of the stirling engine 10 and pressurization of the crankcase 41 will be described according to a first embodiment.

Here, the mean working gas pressure Pmean mentioned above will be described with reference to FIG. 13.

FIG. 13 shows changes of the top position of the high temperature side piston 21 and the top position of the low temperature side piston 31. As described above, the phase difference is provided so that the low temperature side piston 31 moves 90° later by the crank angle than the high temperature side piston 21. In FIG. 13, a combined wave W of a wave form of the high temperature side piston 21 and a wave form of the low temperature side piston 31 represents the intra-cylindrical pressure (intra-cylindrical pressure P of FIG. 2). In FIG. 13, the reference character "Pmean" indicates the mean working gas pressure which is a mean value of the intra-cylindrical pressure.

Figure 2:
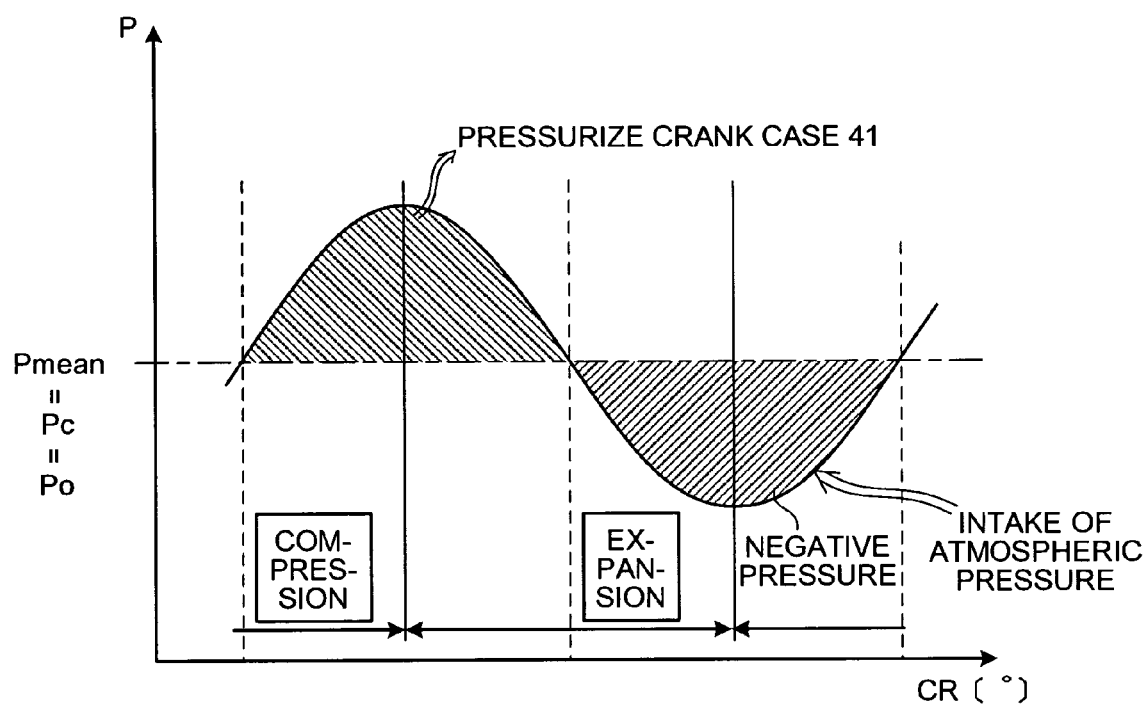
FIG. 2 is a graph of intra-cylindrical pressure prior to pressurization of a crankcase in the stirling engine according to the first embodiment of the present invention.

FIG. 2 shows an initial state of the crankcase 41 of the stirling engine 10 according to the first embodiment prior to the pressurization. The graph of FIG. 2 shows the combined wave W where the vertical axis represents the intra-cylindrical pressure and the horizontal axis represents the crank angle. As shown in FIG. 2, prior to the pressurization of the crankcase 41, the pressure Pc of the crankcase 41 (=mean working gas pressure Pmean) is equal to the atmosphere pressure Po.

In the first embodiment, changes in the pressure (intra-cylindrical pressure P) of the working fluid of the stirling engine 10 is utilized for the increase in the pressure Pc of the crankcase 41 as described later. In general, the intra-cylindrical pressure P moves from a lower range than the mean working gas pressure Pmean (from a second half of the expansion process through a first half of the compression process) up to a higher range than the mean working gas pressure Pmean (from a second half of the compression process through a first half of the expansion process) repeatedly as indicated by the reference character W in FIG. 13. In the first embodiment, the pressure Pc of the crankcase 41 is increased together with the mean working gas pressure Pmean with the use of the changes in the intra-cylindrical pressure P.

In the foregoing, the lower range of the intra-cylindrical pressure P than the mean working gas pressure Pmean corresponds with a period in one cycle of the expansion/pressurization of the working fluid where the working gas pressure is lower than the mean Pmean of the working gas pressure in the pertinent cycle, whereas the higher range of the intra-cylindrical pressure P than the mean working gas pressure Pmean corresponds with a period where the working gas pressure is higher than the mean Pmean of the working gas pressure in the pertinent cycle. The same applies below.

Figure 1:
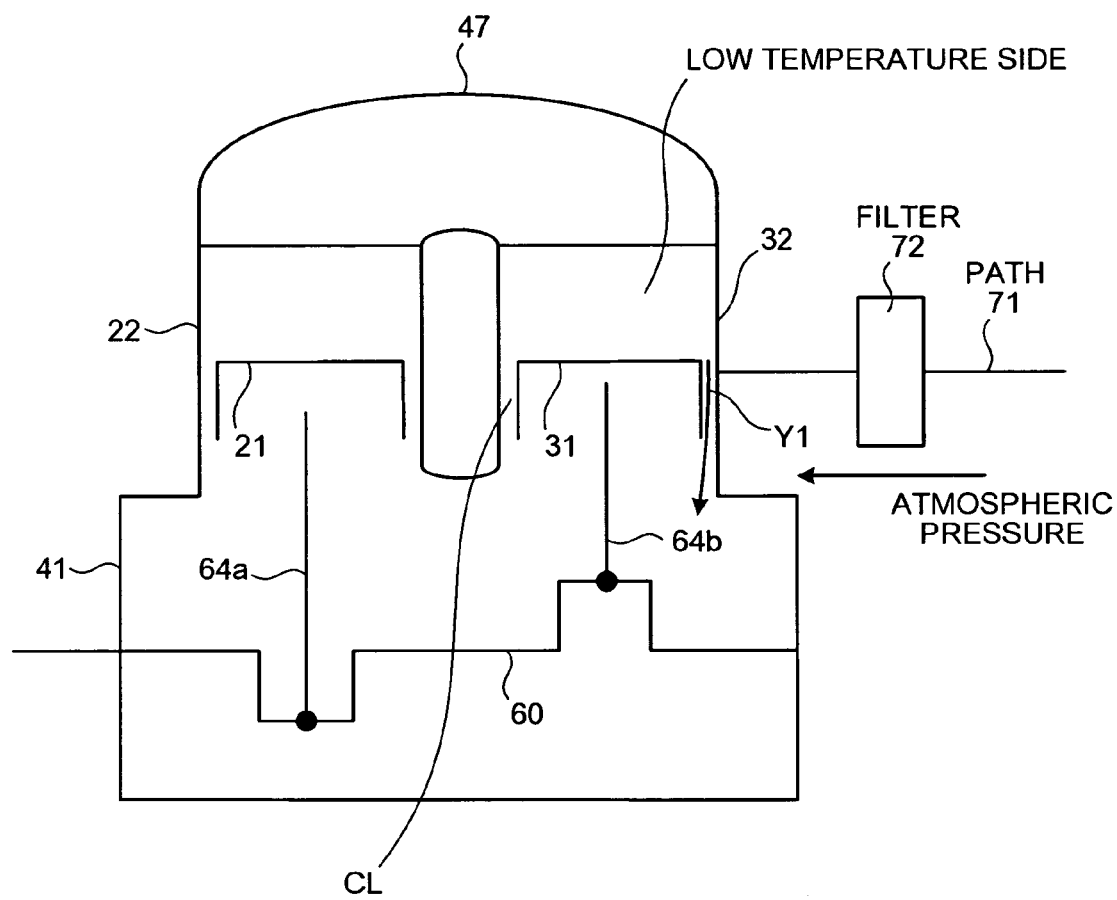
FIG. 1 is a schematic sectional view of a structure of a stirling engine according to a first embodiment of the present invention.

FIG. 1 is a schematic diagram of a structure of the first embodiment. In FIG. 1, the same components with the components shown in FIG. 11 are indicated with the same reference characters and the detailed description thereof will not be repeated.

As shown in FIG. 1, a path 71 is provided at a position corresponding to a position around a lower dead point of the piston 31 in the low temperature side cylinder 32 to communicate with the compression space (inside the cylinder) of the low temperature side cylinder 32. In the path 71 a filter 72 is provided. The path 71 serves to let the fluid (working fluid) of the atmospheric pressure Po flow from the outside of the stirling engine 10 into the cylinder. The path 71 is configured to let the fluid flow (let the pressure transfer) only in one direction, i.e., from the outside into the cylinder.

The filter 72 serves to prevent any impurities from entering the cylinder from outside of the stirling engine 10 via the path 71. As described above, the path 71 is not provided to the high temperature side cylinder 22, but is connected to the low temperature side cylinder 32. Since the thermal difference between the outside of the stirling engine 10, i.e, of a room temperature, and the working fluid is smaller for the compression space of the low temperature side cylinder 32 than for the expansion space of the high temperature side cylinder 22, the path 71 is connected to the low temperature side cylinder 32 to cause relative decrease in the thermal loss at the time the outside air comes into the cylinder.

As shown in FIG. 2, when the intra-cylindrical pressure P drops below the atmospheric pressure Po (becomes a negative pressure) (from the second half of the expansion process through the first half of the compression process), the fluid (air) of the atmospheric pressure Po enters into the cylinder via the path 71, and is pressurized through the compression process of the stirling engine 10 (from the second half of the compression process in particular). The pressure (fluid) pressurized in the compression process is transferred to the crankcase 41 via the clearance CL between the cylinders 32 and 22 and the pistons 31 and 21. Thus, the crankcase 41 is pressurized.

Figure 3:
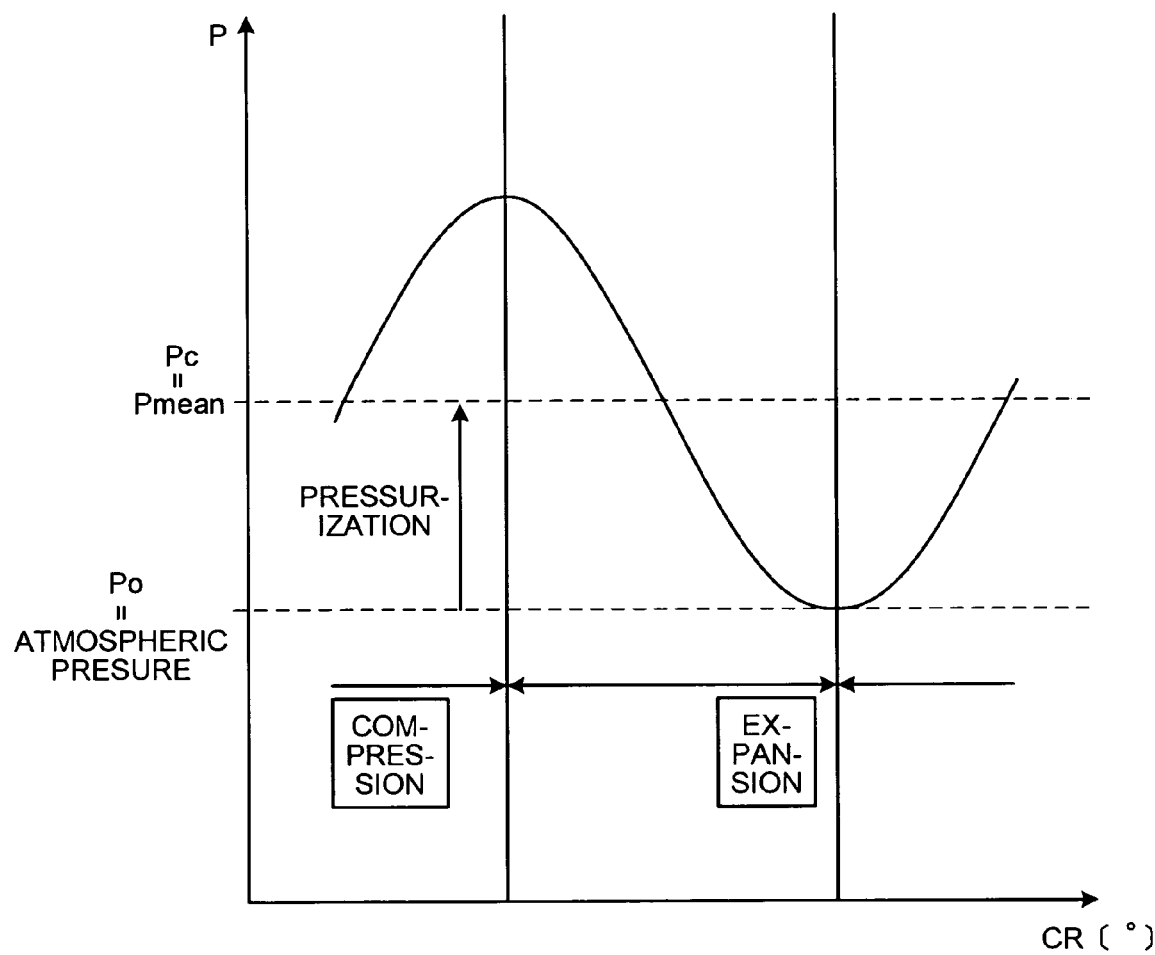
FIG. 3 is a graph of intra-cylindrical pressure after the pressurization of the crankcase in the stirling engine according to the first embodiment of the present invention.

With the repetition of the above described process, the mean working gas pressure Pmean (which is equal to the pressure Pc in the crankcase 41) rises above the atmospheric pressure Po and the mean working gas pressure Pmean attains the level of the pressure Pc of the crankcase 41 as shown in FIG. 3. When the stirling engine 10 operates in the raised state of the mean working gas pressure Pmean, the stirling engine 10 can attain a high output.

Next, with reference to FIG. 4, a pressurizing of the working fluid in the working space of the stirling engine 10 and a pressurizing of the crankcase 41 according to a second embodiment will be described.

Figure 4:
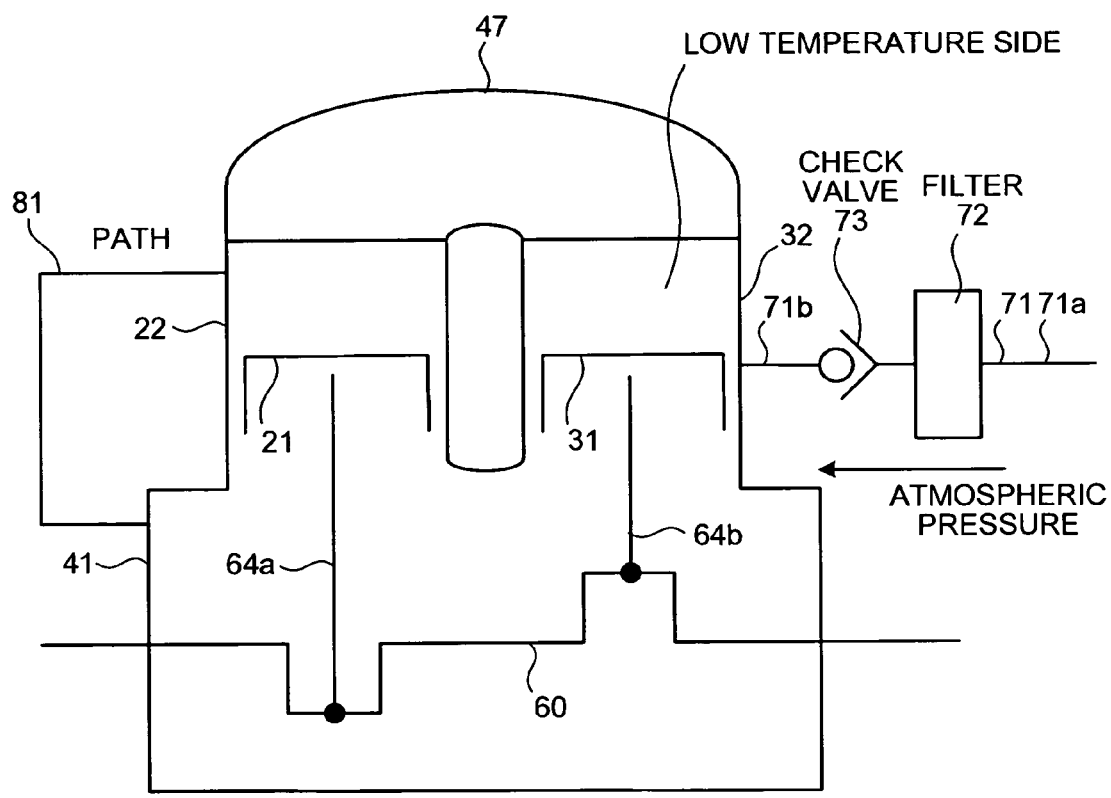
FIG. 4 is a schematic sectional view of a stirling engine according to a second embodiment of the present invention.

FIG. 4 shows a schematic structure of a stirling engine according to the second embodiment. The same component with the first embodiment shown in FIG. 1 is indicated with the same reference character and the description thereof will not be repeated.

The second embodiment is different from the first embodiment in that a check valve 73 is provided in the path 71. The check valve 73 is formed so that the check valve 73 opens only when a pressure at the side of the tip portion 71a of the path 71 is higher than a pressure at the side of a base portion 71b thereof. Hence, the path 71 has a structure to transfer the pressure (working fluid) only in the direction from the outside into the cylinder. In addition, the second embodiment includes a path 81 which connects the interior of the cylinder of the stirling engine 10 with the crankcase 41.

According to the second embodiment, when the intra-cylindrical pressure P of the stirling engine 10 is lower than the atmospheric pressure Po, the fluid of the atmospheric pressure Po of the outside flows into the cylinder via the path 71 and pressurized in the compression process of the stirling engine 10. The pressure increased in the compression process is transmitted to the crankcase 41 via the path 81. Thus, the crankcase 41 is pressurized. With the repetition of the process, the mean working gas pressure Pmean (pressure Pc in the crankcase 41) rises above the atmospheric pressure Po and the mean working gas pressure Pmean attains the level of the pressure Pc of the crankcase 41 as shown in FIG. 3 similar to the first embodiment.

In the first embodiment, when the sealing pressure of the minute clearance between the cylinders 32 and 22 and the pistons 31 and 21 is high, the pressure (fluid) increased in the compression process is not readily transferred to the crankcase 41 via the clearance CL (or the transfer takes time). In the second embodiment, however, since the pressure is transferred to the crankcase 41 via the path 81, such inconvenience will not occur.

Next, a pressurizing of the working fluid in the working space of the stirling engine 10 and a pressurizing of the crankcase 41 according to a third embodiment will be described with reference to FIGS. 5 to 6B.

Figure 5:
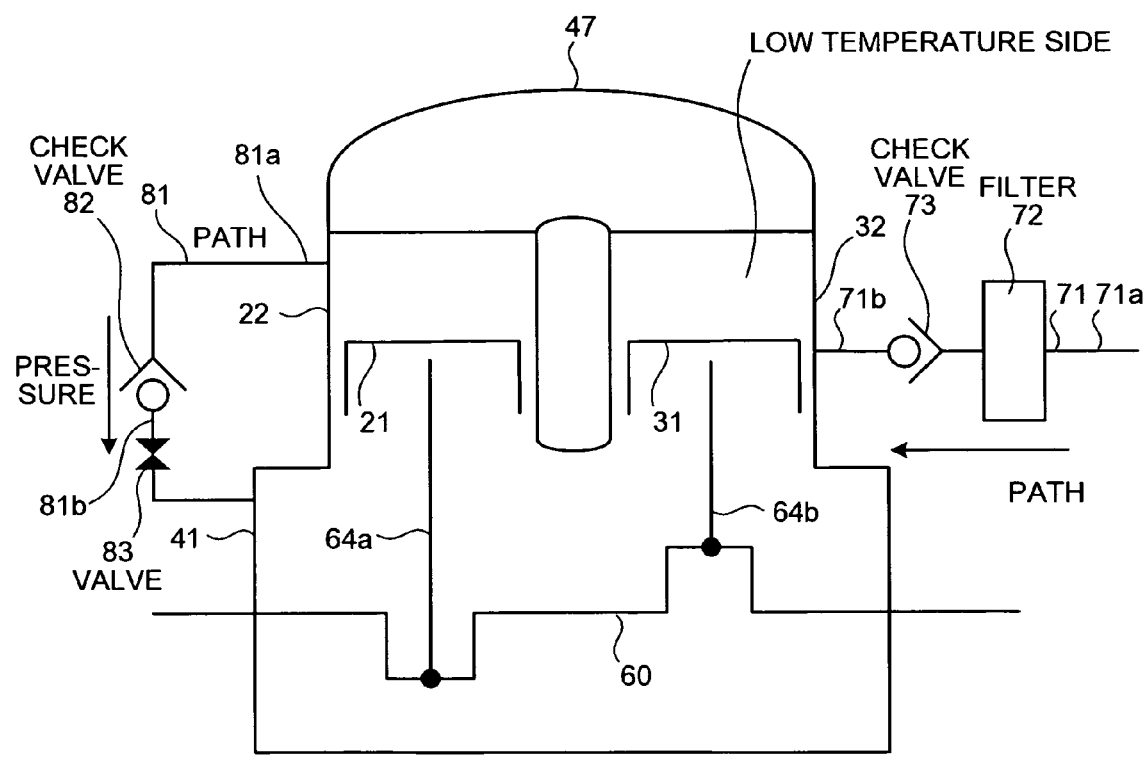
FIG. 5 is a schematic sectional view of a structure of a stirling engine according to a third embodiment of the present invention.

FIG. 5 shows a schematic structure of the third embodiment. The same component with the second embodiment shown in FIG. 4 is indicated with the same reference character and the detailed description thereof will not be repeated. The third embodiment is different from the second embodiment in that a check valve 82 and a valve 83 are provided in the path 81. The check valve 82 is formed so that the check valve opens only when a pressure at the tip portion 81a on the side of the cylinder is higher than a pressure at the tip portion 81b on the side of the crankcase 41.

Figure 6A:
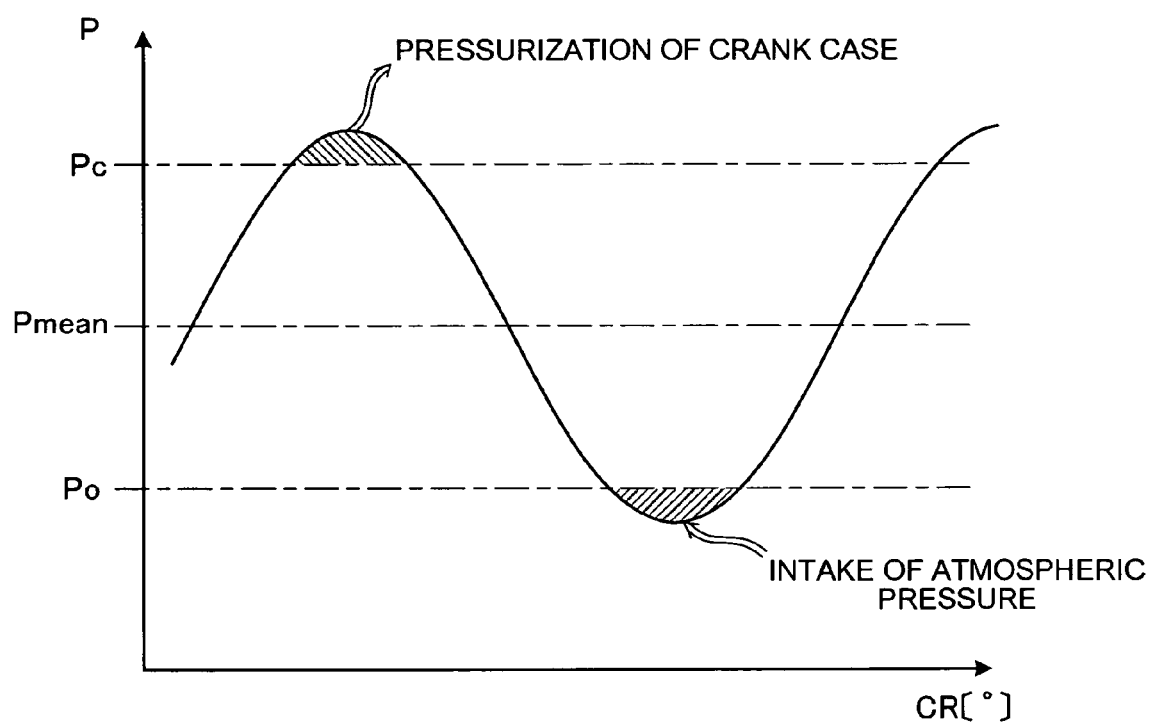
FIG. 6A is a graph of intra-cylindrical pressure prior to closing of a valve in the stirling engine according to the third embodiment of the present invention.
Figure 6B:
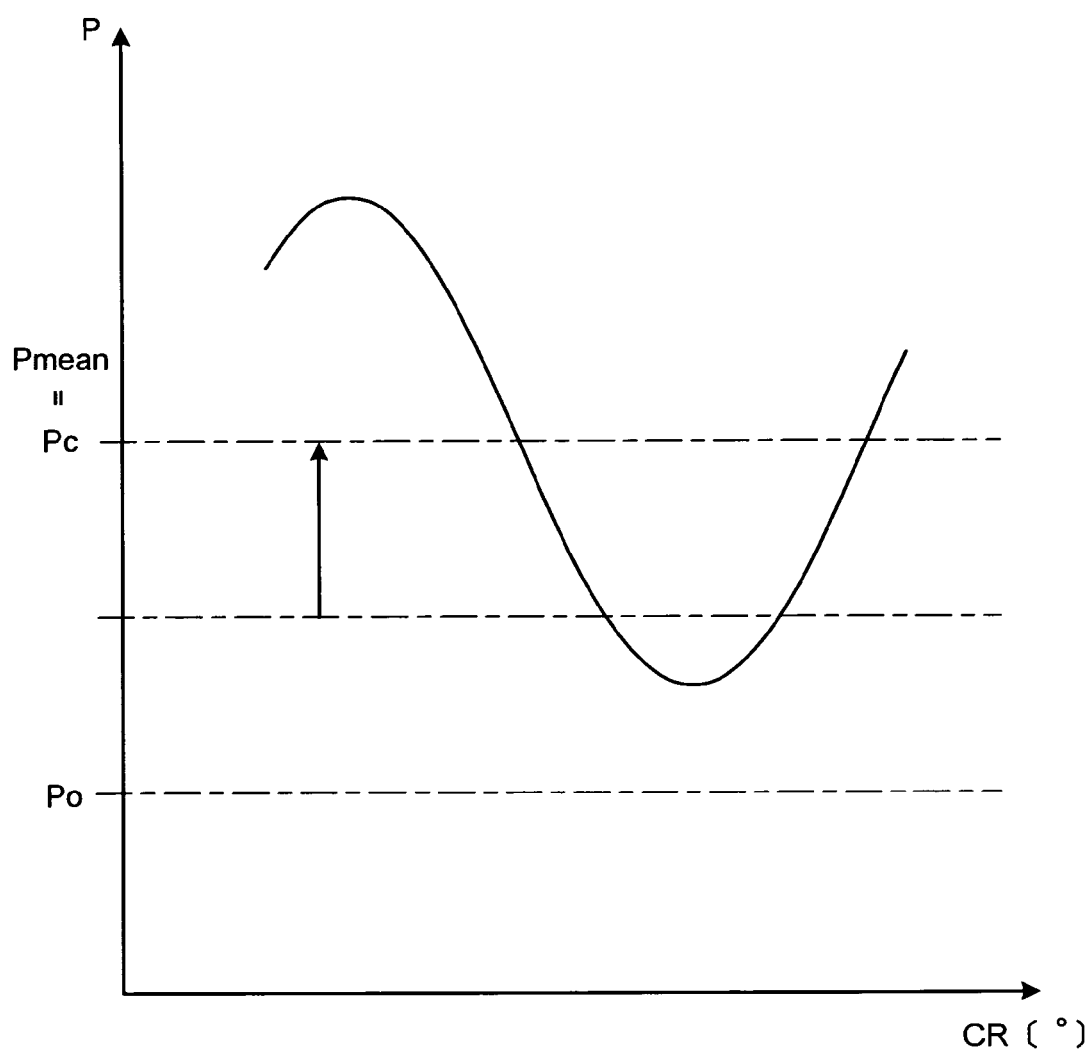
FIG. 6B is a graph of the intra-cylindrical pressure after the closing of the valve in the stirling engine according to the third embodiment of the present invention.

According to the third embodiment, the crankcase 41 is pressurized via the path 81 when the intra-cylindrical pressure P is higher than the pressure Pc of the crankcase 41 while the valve 83 is open as shown in FIG. 6A. When the intra-cylindrical pressure P is lower than the atmospheric pressure Po, the fluid of the atmospheric pressure Po flows into the cylinder via the path 71. With the repetition of the process, the crankcase 41 is pressurized and the valve 83 eventually closes. Then as shown in FIG. 6B, the mean working gas pressure Pmean rises up to the level of the pressure Pc of the crankcase 41.

When the volume of the working fluid in the cylinder and the volume of the crankcase 41 are compared, the volume of the working fluid is smaller than the volume of the crankcase 41. Hence, the mean working gas pressure Pmean rises up to the pressure Pc of the crankcase 41. In the third embodiment, with the check valve 82 and the valve 83 in the path 81, the flow of the fluid from the side of the crankcase 41 into the cylinder via the path 81 can be securely suppressed.

Next, a pressurizing of the working fluid of the working space of the stirling engine 10 and a pressurizing of the crankcase 41 according to a fourth embodiment will be described with reference to FIGS. 7 and 8.

In the first to the third embodiments described above, the pressure Pc of the crankcase 41 is increased with the use of the atmospheric pressure Po. In the fourth embodiment, the pressure Pc of the crankcase 41 is increased with the use of auxiliary machinery such as a pressure source like a pressurizing pump. In the fourth embodiment, reduction in energy consumption of the auxiliary machinery which is used to increase the pressure Pc of the crankcase 41 and downsizing of the installation scale are intended.

In the fourth embodiment, the reduction in energy consumption of the auxiliary machinery and the downsizing of the installation scale are realized through the use of a pumping function accompanying the pressurization/expansion of the stirling engine 10 which is described above with reference to the first to the third embodiments.

Figure 8:
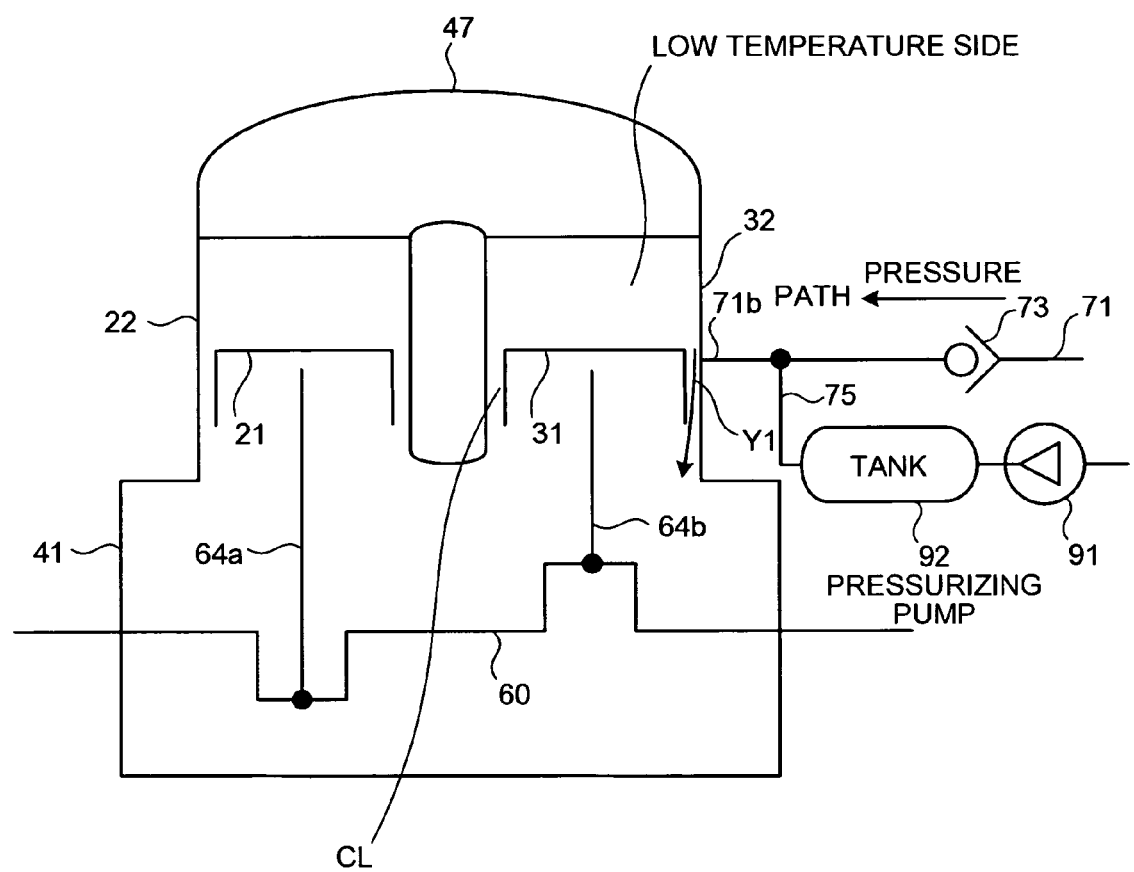
FIG. 8 is a schematic sectional view of a structure of the stirling engine according to the fourth embodiment of the present invention.

FIG. 8 shows a structure of a stirling engine according to the fourth embodiment. The same component with the first embodiment shown in FIG. 1 is indicated with the same reference character and the detailed description thereof will not be repeated. In the fourth embodiment, a branch path 75 is connected to the path 71 so that the branch path 75 diverts from the path 71. The branch path 75 is provided with a pressurizing pump 91 and a tank 92 arranged at a downstream side of the pressurizing pump 91. The tank 92 serves to store the fluid pressurized by the pressurizing pump 91 or the like.

Figure 7:
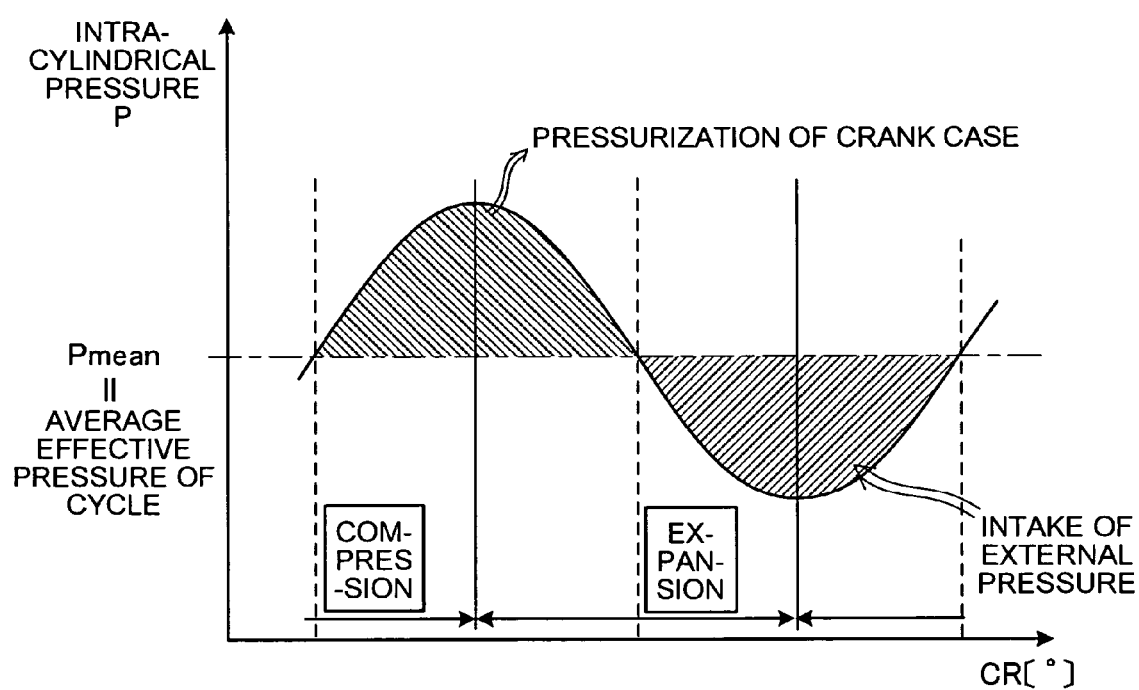
FIG. 7 is a graph of intra-cylindrical pressure prior to pressurization of a crankcase in a stirling engine according to a fourth embodiment of the present invention.

As shown in FIG. 7, in the fourth embodiment, the outside pressure (pressure in the tank 92, and also the atmospheric pressure Po when the intra-cylindrical pressure P is lower than the atmospheric pressure Po) is introduced into the cylinder. The pressure introduced into the cylinder is further increased in the compression process of the stirling engine 10. The pressure (fluid) increased in the compression process is transferred to the crankcase 41 via the clearance CL between the cylinders 32 and 22 and the pistons 31 and 21. Thus, the crankcase 41 is pressurized.

In the fourth embodiment, at the pressurization of the crankcase 41, not only the pressure produced by the pressurizing pump 91 works on the crankcase 41, but the pressure produced through a further pressurization in the compression process of the stirling engine 10 to the pressure produced by the pressurizing pump 91 works on the crankcase 41. Hence, the reduction in energy consumption of the pressurizing pump 91 and the downsizing of the installation scale are realized.

Next, a pressurizing of the working fluid in the working space of the stirling engine 10 and a pressurizing of the crankcase 41 according to a fifth embodiment will be described with reference to FIGS. 9 and 10. The same structure with the embodiments described above will be indicated by the same reference character and the detailed description thereof will not be repeated.

Figure 9:
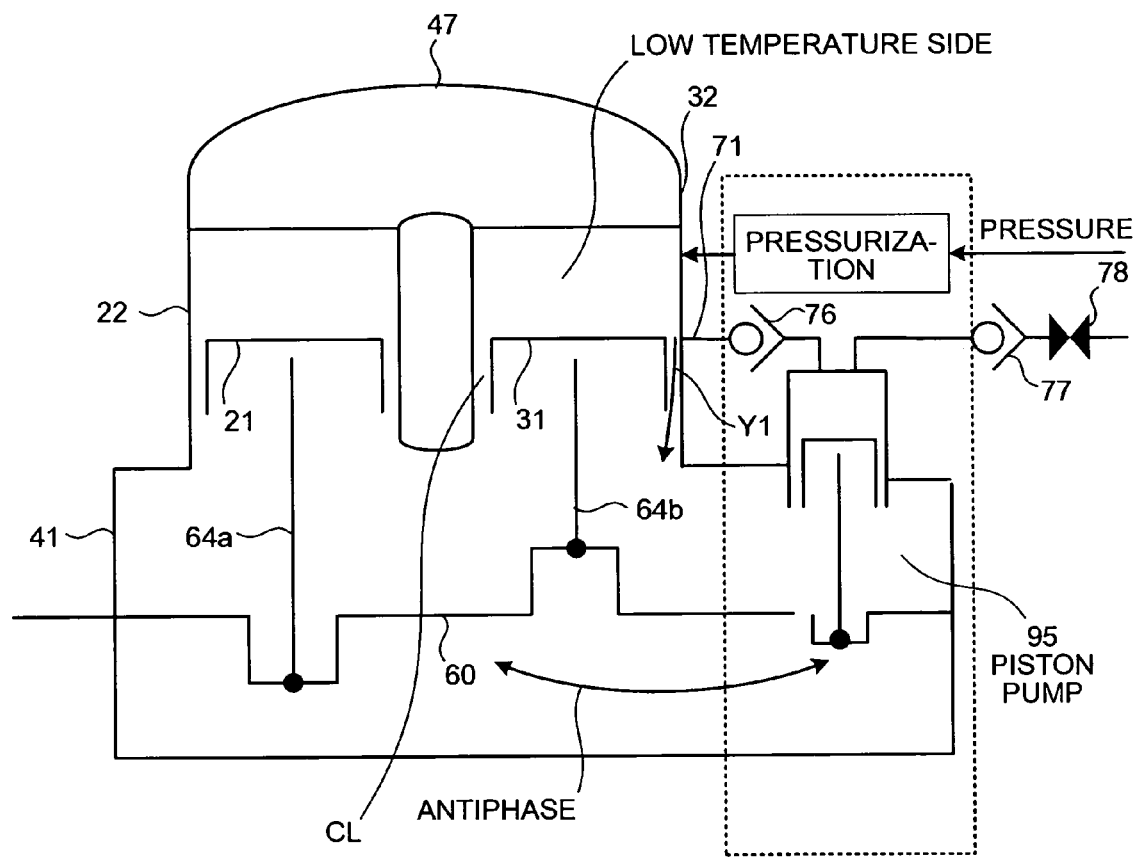
FIG. 9 is a schematic sectional view of a structure of the stirling engine according to a fifth embodiment of the present invention.

As shown in FIG. 9, two check valves 76 and 77 are provided in the path 71 arranged in the low temperature side cylinder 32. The check valves 76 and 77 are formed so that the check valves 76 and 77 open only when a pressure in an upstream side of the path 71 is higher than a pressure in a downstream side of the path 71. A piston pump 95 is arranged between the check valves 76 and 77.

A crank shaft of the piston pump 95 is integrally formed with a crank shaft of the stirling engine 10 and is structured so that the movement of two pistons in the stirling engine 10 and the piston pump 95 are of opposite phase with each other. A valve 78 is further provided on an still upstream side of the check valve 77 in the path 71.

Figure 10:
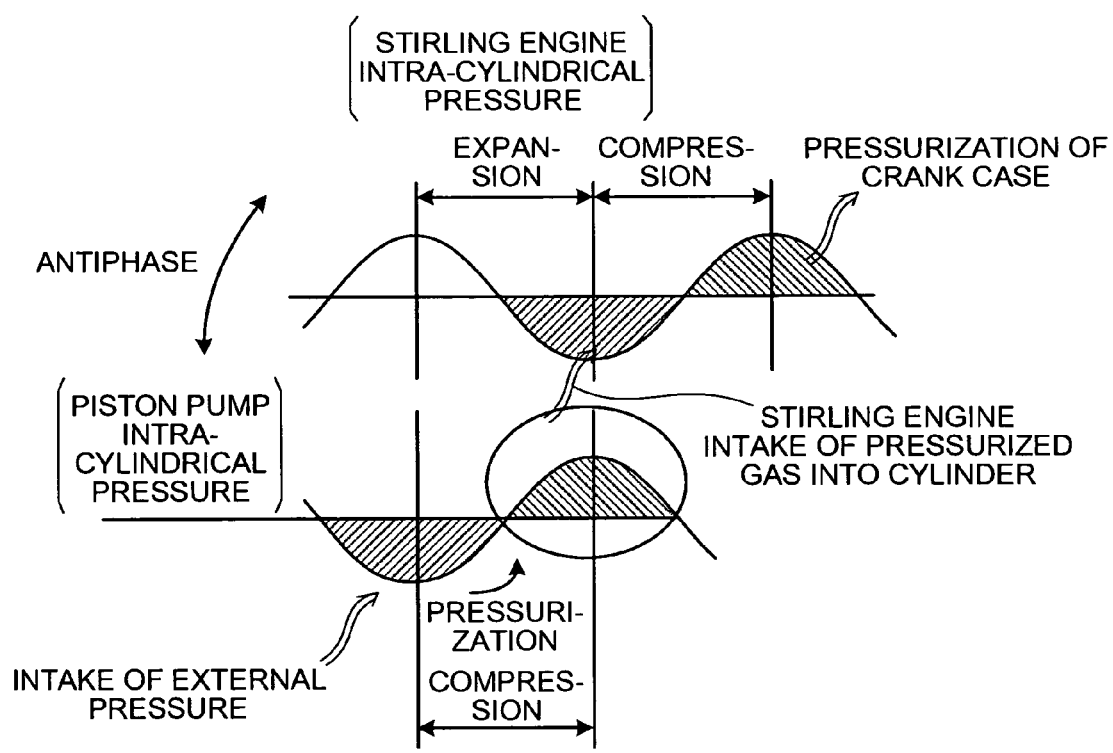
FIG. 10 is a graph of intra-cylindrical pressure of the stirling engine and the intra-cylindrical pressure of a piston pump in the stirling engine according to the fifth embodiment of the present invention.

An upper graph in FIG. 10 represents the intra-cylindrical pressure P of the stirling engine 10 whereas a lower graph in FIG. 10 represents the intra-cylindrical pressure of the piston pump 95. In each graph of FIG. 10, the vertical axis represents pressure and the horizontal axis represents crank angle.

When the valve 78 of FIG. 9 is open and the intra-cylindrical pressure of the piston pump 95 is low (or negative), the external pressure is introduced into the cylinder of the piston pump 95 via the path 71 and is further increased in the compression process of the piston pump 95 as shown in FIG. 10.

In the compression process of the piston pump 95, the intra-cylindrical pressure P of the stirling engine 10 is in the expansion process (due to the antiphase relation), whereby the differential pressure is large. The fluid pressurized in the compression process of the piston pump 95 is introduced into the cylinder when the intra-cylindrical pressure P of the stirling engine 10 is low (in the expansion process) and further pressurized in the compression process of the stirling engine 10. The pressure (fluid) increase in the compression process is transferred to the crankcase 41 via the clearance CL between the cylinders 32 and 22 and the pistons 31 and 21. Thus, the crankcase 41 is pressurized.

As described above, in the stirling engine 10 of the fifth embodiment, the pressure of the crankcase 41 is raised up to the mean working gas pressure Pmean inside the cylinder of the stirling engine 10. Hence, when it is difficult to suppress the pressure leakage to zero through the perfect sealing of the crankcase 41 after the pressurization of the crankcase 41 at the shipping, repressurization of the crankcase 41 is necessary in some manner. Then, a pressurizing source such as the pump 91 or the piston pump 95 may be necessary. These needs considered, it is advantageous to utilize the pumping function of the stirling engine 10 not simply for an original purpose such as acquisition of torque but for the increase of the pressure of the crankcase 41 as described above in order to minimize the installation scale/energy of the pressurizing source.

Here, the first to the fifth embodiments can be combined as appropriate. For example, the path 81 may be provided to connect inside the cylinder and the crankcase 41 to the stirling engine of the fourth and/or the fifth embodiments as in the second or the third embodiment.

As described above, following features are disclosed according to the above described embodiments.

(1) The crankcase is pressurized according to the change in working gas pressure in the stirling engine.

(2) In (1), the crankcase is pressurized through the intake of air from the outside into the cylinder in the stirling engine when the intra-cylindrical pressure P of the stirling engine is lower than the atmospheric pressure Po.

(3) In (1), the crankcase 41 is pressurized through the transfer of the intra-cylindrical pressure P to the crankcase 41 when the intra-cylindrical pressure P is higher than the pressure Pc in the crankcase 41. The crankcase 41 is pressurized with the use of the differential pressure between the pressure Pc of the crankcase 41 and the intra-cylindrical pressure P.

(4) In (2), the path to take in the air is connected to the low temperature side cylinder (to reduce the thermal loss).

(5) In (3), the mean working gas pressure Pmean of the working gas eventually attains the level of the pressure Pc in the crankcase 41.

(6) In (3), the mean working gas pressure Pmean is raised up to the level of the pressure Pc in the crankcase 41 through the closing of the path connecting inside the cylinder with the crankcase 41.

(7) In (2), the impurities are prevented from coming into the cylinder.

(8) The pressurization of the crankcase 41 is complemented by the change in the working gas pressure of the stirling engine.

(9) In (8), the load on the device that pressurizes the crankcase 41 is reduced via the introduction of external pressure from the outside into the cylinder when the intra-cylindrical pressure P is low.

(10) In (8) and (9), the increase of the pressure Pc of the crankcase 41 is speeded up through the introduction of external pressure and pressurization by the stirling engine.

(11) With the addition of the piston which is of antiphase with the power piston of the stirling engine for the pressurization of the crankcase 41, the reduction of energy consumption in the pressurization of the crankcase 41 is achieved.

(12) In one of (8) to (11), the path that introduces the external pressure is connected to the low temperature side cylinder (for the reduction in thermal loss). In the above described embodiments, the stirling engine 10 is connected to the exhaust tube 100 to utilize the exhaust gas from the internal combustion engine of the vehicle as the heat source. The stirling engine of the present invention is, however, not limited to a type that is connected to the exhaust tube of the internal combustion engine of the vehicle.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stirling engine of a two-piston type in which a working gas reciprocates between a compression space which is a working space of a low-temperature side cylinder and an expansion space which is a working space of a high temperature side cylinder, comprising:

a flow path that communicates the working space of the stirling engine and outside of the stirling engine;

check valves which are arranged in the flow path to allow a flow only in a direction from the outside of the stirling engine to the compression space;

a valve that is arranged in the flow path closer to the outside of the stirling engine than the check valves; and a piston pump that is arranged between two of the check valves and can supply pressurized working gas to the flow path, in addition to a low-temperature side piston of the low-temperature side cylinder and a high-temperature side piston of the high temperature side cylinder; wherein a crank shaft of the piston pump is integrally formed with a crank shaft of the stirling engine, and a phase of an intra-cylindrical pressure of the piston pump is opposite to a phase of an intra-cylindrical pressure of the sterling engine which is a combined wave of a pressure waveform of the compression space and a pressure waveform of the expansion space.

2. The stirling engine according to claim 1, wherein the flow path is provided with a filter that prevents an impurity from entering the working space from the outside into via the flow path.

3. The stirling engine according to claim 1, wherein the working gas is supplied from the outside of the stirling engine into the working space via the flow path when a pressure of the working gas in the working space is lower than a mean value of the pressure of the working gas in the working space in one cycle.

4. The stirling engine according to claim 1, wherein a working gas of an atmospheric pressure is supplied from the outside of the stirling engine into the working space via the flow path.

5. The stirling engine according to claim 1, further comprising:

a communication tube that communicates the working space with a crankcase of the stirling engine; and an opening and closing unit that opens and closes the communication tube, wherein the opening and the closing unit is put into a state where the communication tube is open when the pressure of the working gas in the working space is higher than a pressure of the crankcase.

6. The stirling engine according to claim 1, wherein the flow path is provided so that the flow path communicates the working space at the low temperature side of the stirling engine and the outside of the stirling engine.

7. The stirling engine according to claim 1, wherein the low-temperature side piston and the high-temperature side piston reciprocate, respectively, in the low-temperature side cylinder and the high-temperature side cylinder while keeping each cylinder airtight with an air bearing provided between each cylinder and each piston.

8. The stirling engine according to claim 7, further comprising an approximately linear mechanism that is connected to each piston so that the approximately linear mechanism makes an approximately linear motion when each piston reciprocates in each cylinder.

9. A hybrid system comprising:
a stirling engine of a two-piston type in which a working gas reciprocates between a compression space which is a working space of a low-temperature side cylinder and an expansion space which is a working space of a high temperature side cylinder, the stirling engine includes a flow path that communicates the working space of the stirling engine and outside of the stirling engine, a working gas being supplied from the outside of the stirling engine to the working space via the flow path based on a differential pressure of the working space and the outside of the stirling engine;
check valves which are arranged in the flow path to allow a flow only in a direction from the outside of the stirling engine to the compression space;
a valve that is arranged in the flow path closer to the outside of the stirling engine than the check valves; and
a piston pump that is arranged between two of the check valves and can supply pressurized working gas to the flow path, in addition to a low-temperature side piston of the low-temperature side cylinder and a high-temperature side piston of the high temperature side cylinder; wherein
a crank shaft of the piston pump is integrally formed with a crank shaft of the stirling engine, and
a phase of an intra-cylindrical pressure of the piston pump is opposite to a phase of an intra-cylindrical pressure of the sterling engine which is a combined wave of a pressure waveform of the compression space and a pressure waveform of the expansion space; and
an internal combustion engine of a vehicle,
wherein the stirling engine is mounted on the vehicle and a heater of the stirling engine is provided to receive a heat from an exhaust system of the internal combustion engine.

10. The hybrid system according to claim 9, wherein the stirling engine includes
a heat exchanger including a cooler, a regenerator, and the heater,
wherein the heat exchanger is configured so that at least a portion of the heat exchanger forms a curve to connect the low-temperature side cylinder and a high-temperature side cylinder, and
the curve is adapted to connect upper portions of the low-temperature side cylinder and a high-temperature side cylinder where a dimension of an inner diameter of the exhaust tube of the internal combustion engine is approximately same with a distance between an end portion of the heater and an uppermost portion of the heater.

11. The hybrid system according to claim 9,
wherein the stirling engine is attached to the vehicle so that pistons of the stirling engine reciprocate substantially horizontally.

12. A stirling engine of a two-piston type in which a working gas reciprocates between a compression space which is a working space of a low-temperature side cylinder and an expansion space which is a working space of a high-temperature side cylinder, comprising:
a path that can cause a fluid to flow from an outside of the stirling engine to the compression space;
a check valve that is arranged in the path to allow a flow only in a direction from the outside of the stirling engine to the compression space;
a pressurizing pump that can supply pressurized working gas to a branch path which diverts at a position closer to the compression space than the check valve from the path; and
a tank that is arranged at a position closer to the compression space than the pressurizing pump in the branch path to store the working gas pressurized by the pressurizing pump.

13. The stirling engine according to claim 12, wherein pressure of the tank or atmospheric pressure is introduced into a cylinder which contains the compression space and the expansion space, when an intra-cylindrical pressure of the stirling engine which is a combined wave of a pressure waveform of the compression space and a pressure waveform of the expansion space is lower than the pressure tank.

* * * * *